United States Patent [19]

Togawa et al.

[11] Patent Number: 4,752,773

[45] Date of Patent: Jun. 21, 1988

[54] IMAGE DISPLAY APPARATUS CAPABLE OF SELECTIVE AND PARTIAL ERASURE OF INFORMATION

[75] Inventors: Masao Togawa, Yokohama; Hiroshi Kotera, Yokosuka; Shigeru Miyamoto, Tokyo; Seiichi Yasumoto; Kinshiroo Oonishi, both of Hitachi, all of Japan

[73] Assignees: Hitachi, Ltd.; Nippon Telegraph and Telephone Corporation, both of Tokyo, Japan

[21] Appl. No.: 793,798

[22] Filed: Nov. 1, 1985

[30] Foreign Application Priority Data

Nov. 2, 1984 [JP] Japan .................................. 59-230203

[51] Int. Cl.[4] ............................................. G09G 1/16
[52] U.S. Cl. ..................................... 340/721; 340/706; 340/723
[58] Field of Search ............... 340/721, 723, 725, 750, 340/789, 706; 364/521

[56] References Cited

U.S. PATENT DOCUMENTS

| | | | |
|---|---|---|---|
| 4,509,043 | 4/1985 | Mossaides | 340/750 |
| 4,590,558 | 5/1986 | Glover et al. | 364/521 |
| 4,616,336 | 10/1986 | Robertson et al. | 340/721 |
| 4,628,305 | 12/1986 | Ikeda | 340/721 |

FOREIGN PATENT DOCUMENTS

| | | |
|---|---|---|
| 174759 | 10/1982 | Japan . |
| 193855 | 11/1982 | Japan . |
| 231636 | 12/1984 | Japan . |

*Primary Examiner*—Gerald L. Brigance
*Assistant Examiner*—Jeffery A. Brier
*Attorney, Agent, or Firm*—Antonelli, Terry & Wands

[57] ABSTRACT

An image display apparatus wherein a plurality of images having different attributes, such as printed text, a drawing, hand-written data and a natural picture, displayed in superposition on a display screen, are selectively and partially erased. "In this way, it is possible that" the image having a specific attribute, for example, hand-written data, in a designated area selectively erased. Accordingly, operability of the system is improved where a plurality of images having different attributes are superimposed.

9 Claims, 6 Drawing Sheets

IMAGE DISPLAY APPARATUS CAPABLE OF SELECTIVE AND PARTIAL ERASURE OF INFORMATION

BACKGROUND OF THE INVENTION

The present invention relates to partial erasure of a displayed image, and more particularly to an image display apparatus capable of selectively erasing only an image having a specific attribute of a displayed image having a plurality of images having different attributes superimposed.

In a prior art partial erasure method in an image display apparatus, such as that disclosed in Japanese Patent Unexamined Publication Nos. 57-174759, 57-193855 or 59-231636, a partial area of a displayed image is designaged as an erasure area and an image in that area is erased.

However, where images having various attributes, such as text (sentences, drawings), hand-written data (data which is written or recorded as memorandum) and natural picture, are displayed on one screen in superposition, it has not been possible to selectively erase only an image having a specific attribute in a designated erasure area.

In the prior art method, the partial area of the displayed image is totally erased, and where a plurality of images having different attributes are displayed in superposition, it is not possible to erase only the image having the designated attribute. For example, where the text and hand-written text are displayed in superposition and if a partial area which contains the handwritten data is designated, not only the hand-written data but also the text are erased.

SUMMARY OF THE INVENTION

It is an object of the present invention to provide an image display apparatus which displays a plurality of images having different attributes in superposition and which can erase only an image having a specific attribute in a designated erasure area.

In the present invention, it has been noticed that the plurality of images displayed on a screen in superposition can be managed by their attributes and a partial erasure area can be set for each attribute, and the partial erasure of the image is limited to the image having the specific attribute in the designated area.

DESCRIPTION OF THE PREFERRED EMBODIMENTS

Figure 1:
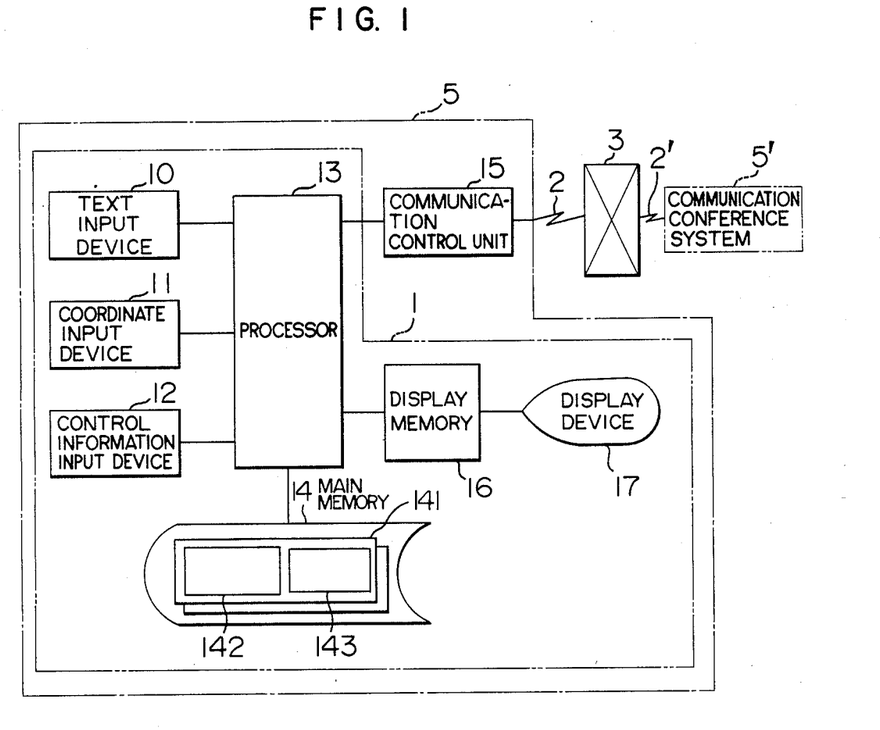
FIG. 1 shows a system configuration of a communication conference system having an image display apparatus of the present invention.

An embodiment of the present invention will be described with reference to FIGS. 1 to 5. FIG. 1 shows a system in which communication conference systems each having an image display apparatus are interconnected through communication lines, and transmit images to each other to enable a conference between distant locations. Numeral 5 denotes the communication conference system having the image display apparatus 1, which is connected to the other communication conference system 5' through the communication line 2, an exchanger 3 and the communication line 2'.

The communication conference system 5 includes a text input device, such as a facsimile machine for inputting text, a coordinate input device 11 such as a digitizer for inputting a coordinate, and a control information input device 12 such as switches for inputting control information. A processor 13 is connected to a main memory 14 which has a plurality of memory areas 141 each for storing one page of display image. Each memory area 141 has an area for storing image data having different attributes. In the present embodiment, it comprises a memory area 142 for an attribute of text and a memory area 143 for an attribute of hand-written data. A display memory 16 stores image display data and a display device 17 displays an image.

The text input device 10, coordinate input device 11, control information input device 12, processor 13, main memory 14, display memory 16 and display device 17 constitute the image display apparatus 1. The communication conference system 5 includes a communication control unit 15 which controls communication with the other communication conference system 5'. The communication conference system 5' is configured in the same manner.

Feferring to flow charts of FIGS. 2 to 5, the partial erasure of the image is explained.

Figure 2:
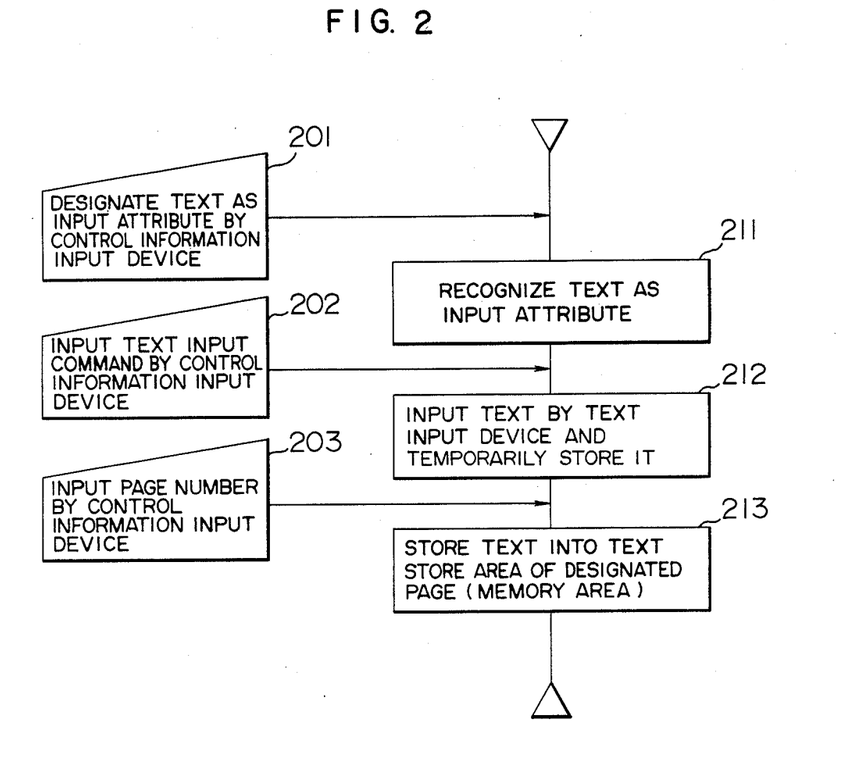
FIG. 2 is a flow chart showing a procedure for inputting a text.

FIG. 2 shows a flow chart for inputting the text.

When an operator designates text as an input attribute by the control information input device 12 (step 201), the processor 13 recognizes that the information to be inputted has the attribute of text and temporarily stores it in the main memory (step 211). Then, when the operator inputs a text input command by the control information input device 12 (step 202), the processor 13 inputs the text by the text input device 10 and temporarily stores it in the main memory (step 212). In the step 212, the text data may be temporarily stored in the display memory 16 instead of the main memory. If it is stored in the display memory 16, the input information can be immediately displayed so that the operator can know the current input text. When the operator inputs a page number by the control information input device 12 (step 203), the processor 13 transfers the text temporarily stored in the main memory 14 or display memory 16 into the memory area 142 for the attribute of text in the memory area 141 for the designated page in the main memory 14 (step 213).

In the flow chart of FIG. 2 for inputting the text, the designation of the input attribute in the steps 201 and 211 and the inputting of the text in the steps 202 and 212 are interchangeable. If those steps are interchanged, it is possible to display the input information on the display device 17 and then the operator inputs the attribute by the control information input device 12 after the operator determines the attribute of the displayed information. This procedure is effective when the information inputted by one input device includes a plurality of attributes, for example, when the image is to be handled by two attributes, sentence and drawing.

Where only the information having the attribute of text is inputted by the text input device 13 of FIG. 1, that is, where the input device and the attribute of the information inputted thereby have a one-to-one correspondence, the steps 201 and 202 of FIG. 2 may be omitted so that the operability is further improved.

Figure 3:
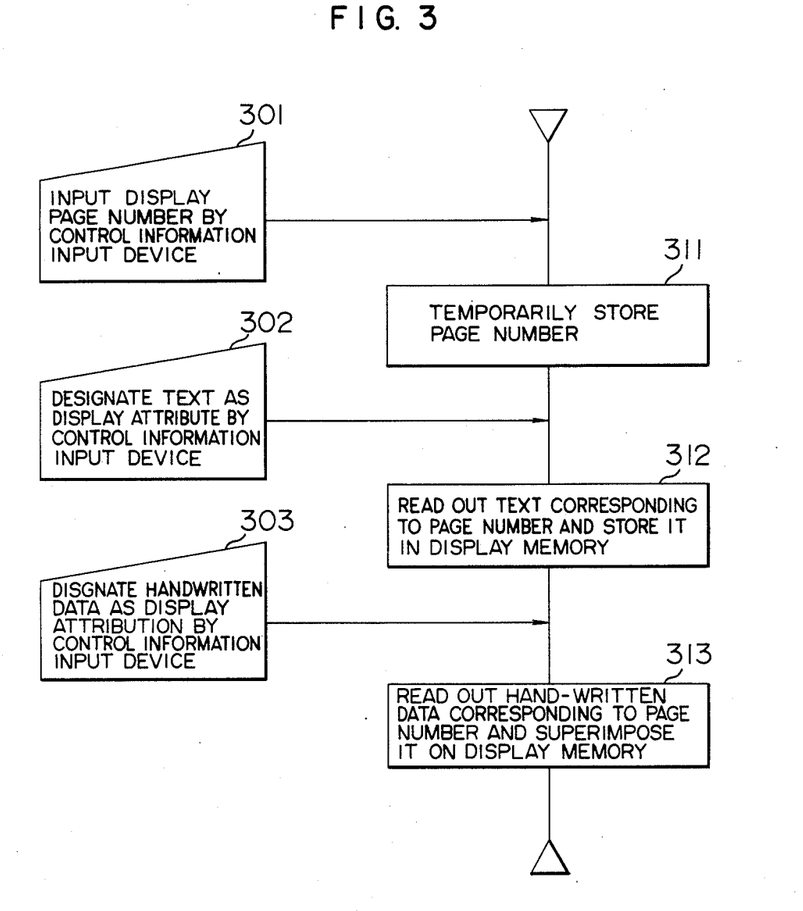
FIG. 3 is a flow chart showing a procedure for displaying on a screen.

FIG. 3 shows a flow chart for displaying the image. When the operator inputs a page number to be displayed, by the control information input device 12 (step 301), the processor 13 locates the memory area 141 for the designated page in the main memory 14 based on the input display page number and temporarily stores it in the main memory (step 311). Then, when the operator designates the text as the display attribute by the control information input device 12 (step 302), the processor 13 reads out the information from the memory area 142 for the attribute of text in the memory area 141 for the location of the main memory in which the information was temporarily stored, and stores it in the display memory 16 (step 312). Thus, the text is displayed on the display device 17. When the operator designates the hand-written data as the display attribute by the control information input device 12 (step 303), the processor 13 reads out the information from the memory area 143 for the attribute of hand-written data in the memory area 141 for the location of the main memory in which the data was temporarily stored, and superimposes it on the display memory 16 (step 313). At this moment, both the text and the hand-written data are simultaneously displayed on the display device 17.

Figure 4:
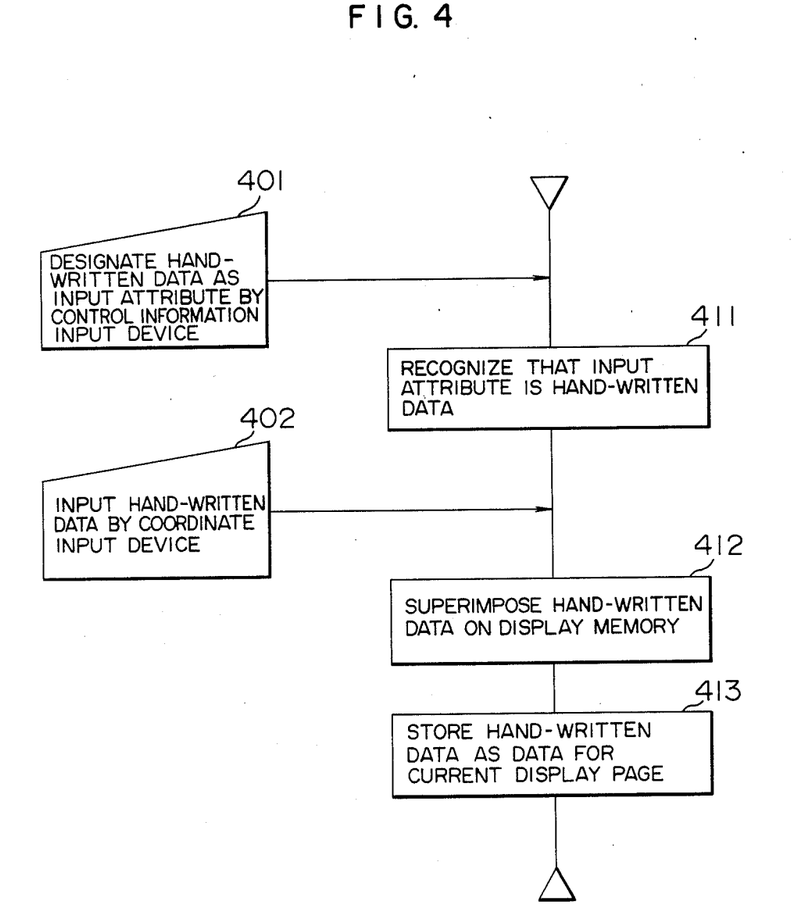
FIG. 4 is a flow chart showing a procedure for entering a hand-written data.

FIG. 4 shows a flow chart for entering the hand-written data. When the operator designates the hand-written data as the input attribute by the control information input device 12 (step 401), the processor 13 recognizes that the information to be inputted has the attribute of hand-written data and temporarily stores it in the main memory (step 411). Then, the operator inputs the hand-written data by the coordinate input device 11 (step 402). The processor 13 superimposes the input hand-written data onto the display memory 16 (step 412) and stores it in the memory area 143 for the attribute of hand-written data in the memory area 141 in the main memory 14 corresponding to the display page number on the display memory 16 (step 413). Where the input device and the attribute of the information inputted thereby have a one-to-one correspondence, the attribute need not be designated and the steps 401 and 411 may be omitted so that the operability is further improved.

Figure 5:
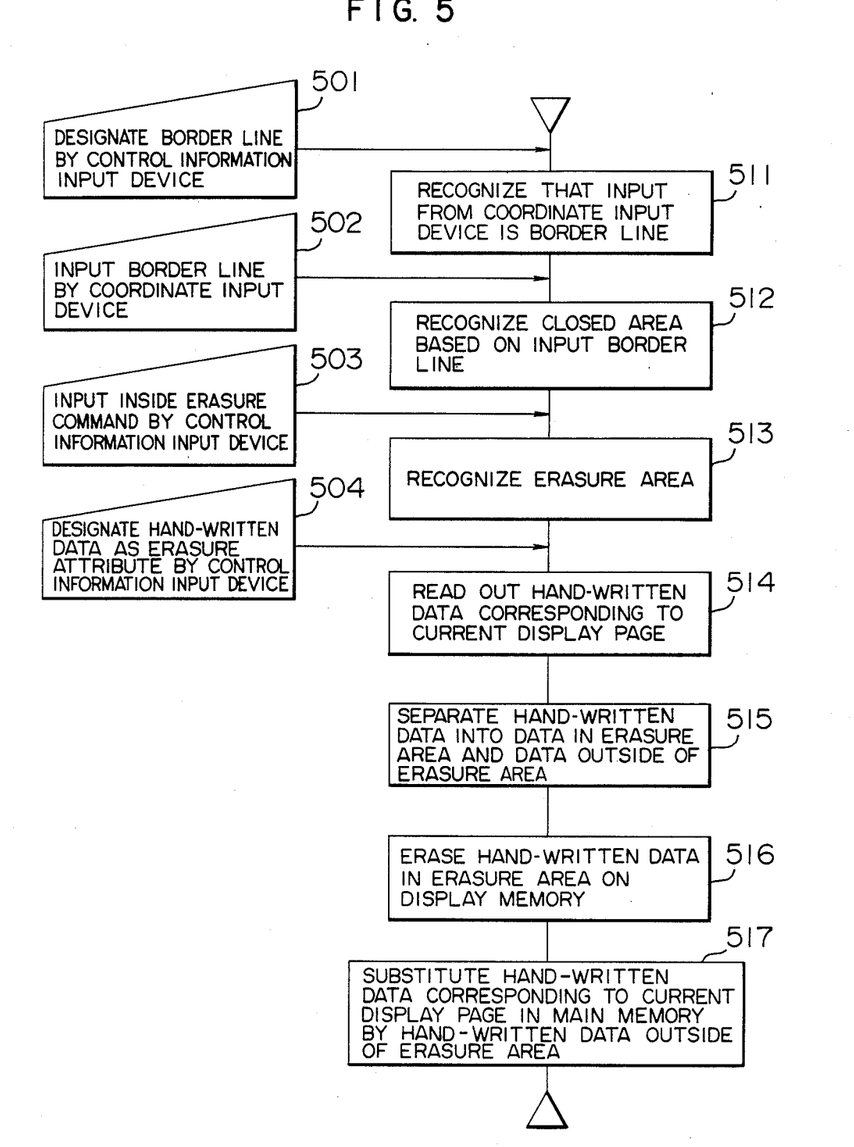
FIG. 5 is a flow chart showing a procedure for erasing a portion of the hand-written data.

FIG. 5 shows a flow chart for erasing a portion of the hand-written data.

As the operator designates an erasure area border line input by the control information input device 12 (step 501), the processor 13 recognizes that the information inputted by the coordinate input device 11 is the erasure area border line and temporarily stores it in the main memory (step 511). Then, the operator inputs the border line of the area to be erased, by the coordinate input device 11 (step 502) and the processor 13 recognizes a closed area surrounded by the border lines based on the input border line information, and temporarily stores it in the main memory (step 512).

When the border line is inputted, it may be displayed on the display device 17 although it is not described here because it has no direct connection with the present invention.

Then, when the operator designates by the control information input device 12 that the area to be erased is the inside of the designated closed area (step 503), the processor 13 recognizes that the inside of the closed area is the area to be erased, and temporarily stores it in the main memory (step 513).

Then, the operator designates by the control information input device 12 that the attribute of the information to be erased is the hand-written data (step 504). The processor 13 reads out the information from the memory area 143 for the attribute of hand-written data in the memory area 141 corresponding to the display page number stored in the display memory 16 (step 514). Then, it separates the hand-written data into that in the erasure area and that outside the erasure area, by referring to the erasure area recognized in the step 513 (step 515). Of the hand-written data superimposed on the display memory 16, only the hand-written data in the erasure area is erased (step 516). In accordance with the feature of the present invention, the information in the erasure area is not erased unless it is the hand-written data, that is, it does not have the designated attribute. In one example of this processing, of the hand-written data superimposed on the display memory 16, only the hand-written data in the erasure area is traced so that the color thereof is changed to the same color as the background color.

Finally, in order to match the information stored in the memory area 141 corresponding to the display page number in the main memory 14 to the information in the display memory 16, the hand-written data stored in the memory area 143 for the attribute of hand-written data in the memory area 141 is replaced with the hand-written data outside of the erasure area separated in the step 515 (step 517).

In the present embodiment, the erasure attribute is designated by the control information input device 12, although it may be designated by other means. One attribute for the partial erasure of the image may be predetermined. In the present embodiment, if the attribute for the partial erasure of the image is preset to the hand-written data, the step 504 may be omitted and the operability is improved.

When the attribute for the partial erasure of the image is the hand-written data, the border line is inputted by the coordinate input device 12, and when the attributes are both the text and the hand-written data, the border line is inputted by the control information input device 12. When the attribute for the partial erasure is determined by the device which inputs the border line, the step 504 may be omitted.

In the above description, the erasure area is the inside of the closed area surrounded by the border lines. Alternatively, the erasure area may be the outside of the closed area. If the erasure area is specified to the inside or the outside of the closed area, the step 504 may be omitted.

In the above description, the portion of the hand-written data is erased. When other imagaes are to be erased in accordance with the present invention, several methods may be implemented.

Where a two-dimensional image such as a drawing is superimposed on one display memory for display, it is effective to delete the image in the erasure area, of the information having the designated attribute and then resuperimpose the information currently superimposed on the display memory.

In the above description, the images to be displayed in superposition are stored in one display memory in superposition. In a modification, each of the images is stored in each of display memories one for each attribute, and the signals from the respective display memories are combined and displayed. In such a system, the inside of the erasure area of the display memory for the attribute to be erased is erased.

Figure 6A:
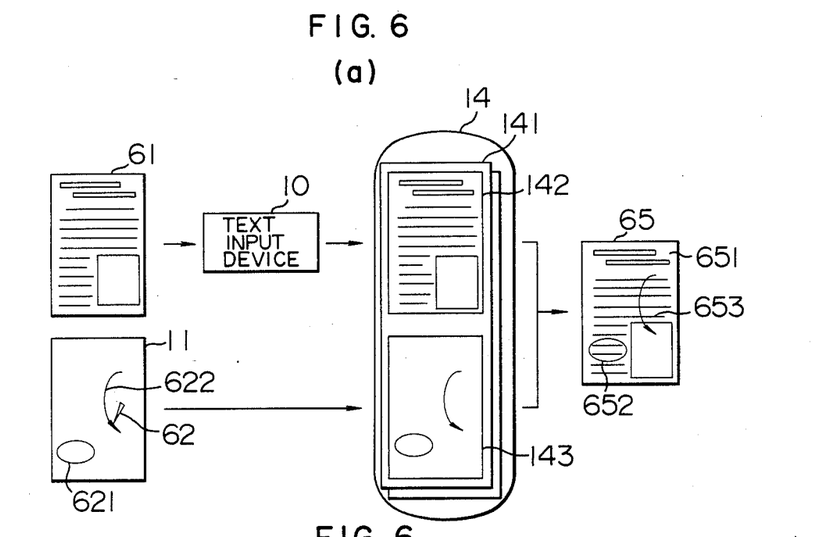
FIGS. 6(a), 6(b) and 6(c) are a conceptual view for illustrating partial erasure of the displayed image.
Figure 6B:
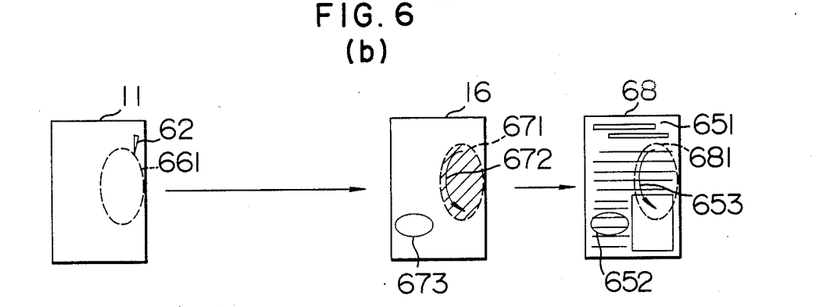
Figure 6C:
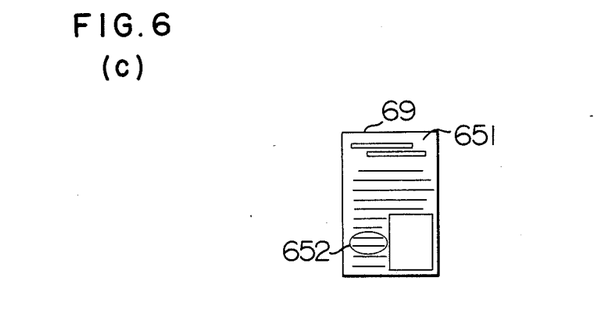

Referring to FIG. 6, an operation as seen from the operator will be explained. In FIG. 6(a), a text 61 and hand-written data 621 and 622 are inputted to the text input device 10 and the coordinate input device 11, respectively, and they are displayed as an image 65 on the display device 17. In FIG. 6(b), a border line 661 is inputted to surround hand-written data 653 to be erased and an erasure area 671 is designated. In FIG. 6(c), the image is partially erased.

In FIG. 6(a), the operator first sets the printed or hand-written text 61 onto the text input device 10, designates the text as the input attribute by the control information input device 12, inputs the text input command and inputs the page number in accordance with the flow chart of FIG. 2. Thus, the text 61 is stored in the memory area 142 for the attribute of text in the memory area 141 corresponding to the page number in the main memory 14. The operator further inputs the display page number and designates the text as the display attribute in accordance with the flow chart of FIG. 3 so that the text 61 is displayed as the text 651 on the screen 65 of the display device.

As the operator designates the hand-written data as the input attribute by the control information input device 12 and inputs the hand-written data 621 and 622 by the coordinate input device 12 by using an input device 62 such as a stylus pen, the input hand-written data is displayed as the data 652 and 653 on the screen 65 in superposition, and stored in the memory area 143 for the attribute of hand-written data in the memory area 141 corresponding to the display page number.

In FIG. 6(b), an arrow in the hand-written data 653 is erased in accordance with the flow chart of FIG. 5. The operator designates the border line by the control information input device 12 and inputs the border line 661 by the coordinate input device 11 by using the input means 62. As it is inputted, the border line 681 is displayed on the screen 68 of the display device 17. The operator further inputs the inside erasure command by the control information input device 12 and designates the hand-written data as the erasure attribute. As the hand-written data is designated as the erasure attribute, the erasure area 671 is recognized in the display memory 16 and the hand-written data is separated into the data 672 inside of the erasure area and the data 673 outside of the erasure area. The data 672 in the erasure area is erased. After the erasure, the image 69 shown in FIG. 6(c) is displayed on the screen.

The preferred embodiment of the present invention has been explained in connection with the image display apparatus in the communication conference system, although the present invention is not limited to the communication conference system but applicable to an image display apparatus which displays images in superposition.

In accordance with the present invention, when a portion of the image is to be erased, the erasure area and the attribute of the image are designated and the partial erasure of the image can be effected finely based on the both conditions.

Unless the attribute of the image is designated, the image is not erased even if it is within the erasure area. For example, when the hand-written data written between lines of the text displayed on the display device is to be erased, the erasure area may be relatively large so long as other data which is not to be erased is not included therein, and the hand-written data is designated as the erasure attribute.

In the present invention, the operability is significantly improved when only the portion of the image having the specific attribute, of the images having different attributes displayed in superposition, is to be erased.

We claim:

1. In an image display apparatus having means for displaying in superposition a plurality of image information having different attributes, such as printed text, drawing and handwritten data, the improvement comprising:

area designation means for designating an area of a displayed image;

attribute designating means for designating an attribute of an image to be at least partially erased in a displayed image;

erasure area designating means for designating as an erasure area either the inside or outside of the area designated by said area designation means; and means for managing display of the image information on said display means attribute by attribute so that an image information having a specific attribute designated by said attribute designating means is erased from the image information in the erasure area.

2. An image display apparatus according to claim 1, wherein an erasure attribute is predetermined.

3. An image display apparatus according to claim 1, wherein an erasure attribute is designated prior to the designation of the erasure area.

4. An image display apparatus according to claim 1, wherein an erasure attribute is designated after the designation of the erasure area, and by the designation an attribute to be erased is determined.

5. An image display apparatus according to claim 1, wherein a plurality of erasure area designation means are provided and erasure attributes are provided one for each erasure area designation means.

6. In an image display apparatus having means for displaying in superposition a plurality of image information having different attributes, such as printed text, drawing and hand-written data, the improvement comprising:

image input means for inputting an image to be displayed;

area designation means for designating an area of a displayed image;

attribute designating means for designating an attribute of an image to be at least partially erased in a displayed image;

erasure area designating means for designating as an erasure area either the inside or outside of the area designated by said area designation means; and means for managing display of the image information on said displaying means attribute by attribute so that image information having a specific attribute designated by the attribute designation means is erased from the image information in the erasure area.

7. An image display apparatus according to claim 6, wherein a plurality of image input means are provided and attributes are predetermined for said image input means so that the attribute designation step may be omitted.

8. In an image display apparatus having means for displaying in superposition a plurality of image information having different attributes, such as printed text, drawing and handwritten data, the improvement comprising:
- a memory for storing an image to be displayed, attribute by attribute;
- area designation means for designating an area of a displayed image;
- attribute designating means for designating an attribute of an image to be at least partially erased in a displayed image;
- erasure area designating means for designating as an erasure area either the inside or outside of the area designated by said area designation means; and
- means for managing display of the image information on said displaying means attribute by attribute so that the image information in the memory area for the erasure attribute is accessed and the image information having a specific attribute designated by said attribute designating means is erased from the image information in the erasure area.

9. In an image display apparatus having means for displaying in superposition a plurality of image information having different attributes, such as text, drawing and handwritten data, the improvement comprising:
- a memory for storing display images for each attribute of the image information;
- a display memory for holding a plurality of images in the form of pixel information relating to said attributes in superposition;
- attribute designating means for designating an attribute of an image to be erased in the superposed images in said display memory;
- partial area designating means for designating a partial area of a displayed image by a closed curve inputted from a coordinate input device;
- erasure area designating means for designating as an erasure area either an inside area or an outside of area of said closed curve;
- means for accessing only the image information in a storage area corresponding to the attribute designated by said attribute designating means;
- means for discriminating a portion of the image information corresponding to the erasure area from a series of image information taken out by said accessing means;
- means for erasing a content of said display means corresponding to the discriminated image information; and
- means for managing the display of image information on said display means for each attribute thereof so that only the image information which has a specific attribute either in the inside or outside of the area designated by said partial area designating means is selectively erased.

* * * * *